United States Patent
Kung

(10) Patent No.: US 9,160,194 B2
(45) Date of Patent: Oct. 13, 2015

(54) BI-DIRECTIONAL SWITCHING REGULATOR AND CONTROL CIRCUIT THEREOF

(71) Applicant: Nien-Hui Kung, HsinChu (TW)

(72) Inventor: Nien-Hui Kung, HsinChu (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 243 days.

(21) Appl. No.: 13/928,936

(22) Filed: Jun. 27, 2013

(65) Prior Publication Data
US 2015/0002097 A1     Jan. 1, 2015

(51) Int. Cl.
*H02J 7/00*     (2006.01)
(52) U.S. Cl.
CPC ................. *H02J 7/0072* (2013.01)
(58) Field of Classification Search
CPC ............................................. H02M 3/33584
USPC ....................................................... 320/128
See application file for complete search history.

(56) References Cited

U.S. PATENT DOCUMENTS

| | | | |
|---|---|---|---|
| 2009/0108677 A1* | 4/2009 | Walter et al. | 307/80 |
| 2010/0237840 A1* | 9/2010 | Walter et al. | 323/282 |
| 2011/0074356 A1* | 3/2011 | Yamazaki et al. | 320/134 |
| 2012/0262133 A1* | 10/2012 | Martinelli | 323/234 |
| 2013/0119957 A1* | 5/2013 | Kung | 323/299 |
| 2013/0322128 A1* | 12/2013 | Takegami | 363/17 |
| 2014/0361730 A1* | 12/2014 | Kung | 320/107 |
| 2015/0035493 A1* | 2/2015 | Kung | 320/128 |

* cited by examiner

*Primary Examiner* — Suchin Parihar
(74) *Attorney, Agent, or Firm* — Tung & Associates

(57) ABSTRACT

The present invention discloses a bi-directional switching regulator and a control circuit of the bi-directional switching regulator. The bi-directional switching regulator includes a power stage, an operation circuit, and a power path management circuit. The operation circuit generates a first operation signal to control a boost conversion operation or a buck conversion operation of the power stage. The power path management circuit includes a power path switch electrically connected between the output terminal and the battery, for controlling a charging operation from the output terminal to the battery. The operation circuit generates the first operation signal so that: (1) the output voltage is determined by a sum of a safety offset and the battery voltage; or (2) the output voltage is determined by a higher one between a predetermined voltage level and the sum of the safety offset and the battery voltage.

16 Claims, 7 Drawing Sheets

US 9,160,194 B2

BI-DIRECTIONAL SWITCHING REGULATOR AND CONTROL CIRCUIT THEREOF

BACKGROUND OF THE INVENTION

1. Field of Invention

The present invention relates to a bi-directional switching regulator and a control circuit of the bi-directional switching regulator; particularly, it relates to such bi-directional switching regulator and control circuit capable of effectively controlling the charging current to prevent the circuit from being crashed and the battery from being damaged.

2. Description of Related Art

Please refer to FIG. 1, which shows a schematic diagram of a conventional bi-directional switching regulator. The bi-directional switching regulator 10 can operate under a power supply mode (a discharging mode) or a charging mode. When the bi-directional switching regulator 10 is under the charging mode, it conducts a boost power conversion and converts an input voltage VBUS to an output voltage VSYS. That is, the bi-directional switching regulator 10 converts the lower input voltage VBUS to the higher output voltage VSYS. In this case, the input terminal BUS supplying the input voltage VBUS can be connected to an external power source. The output terminal SYS generating the output voltage VSYS can be connected to a battery and/or a system load. When the input terminal BUS is connected to an external circuit instead of an external power source, the bi-directional switching regulator becomes a buck switching regulator operating under a power supply mode. That is, the same circuit shown in FIG. 1 will operate to convert a higher battery voltage VBAT from the battery BAT to a lower input voltage VBUS through the power stage 11 and supplies power to the external circuit connected to the input terminal BUS. Generally, a current control switch will be provided between the output terminal SYS and the battery BAT.

The power stage 11 includes an upper-gate switch S2, a lower-gate switch S3 and an inductor L, all of which are connected to a common switching node LX. Under the charging mode, a current supplied from the external power source will flow toward the output terminal SYS through the inductor L and the upper-gate switch S2. This conventional bi-directional switching regulator 10 is not suitable for the application where the output terminal SYS acts as an USB port, because the charges injected by hot plug-in may damage the battery. And, if the battery voltage VBAT is too low, the level of the output voltage VSYS will also be affected, which may cause the system load to be unable to operate normally. Besides, under the circumstance where the battery BAT is not connected, if the battery terminal (the node where the battery voltage VBAT is) is short-circuited, the power stage 11 will keep operating to supply current to the battery terminal, causing serious problems to crash the bi-directional switching regulator 10 and to damage the circuit. Therefore, the current control switch M1 must be properly controlled to overcome such problems of the prior art.

In view of the above, to overcome the drawbacks in the prior art, the present invention proposes a bi-directional switching regulator and a control circuit of the bi-directional switching regulator capable of effectively controlling the charging current to prevent the switching regulator from being crashed and the battery from being damaged.

SUMMARY OF THE INVENTION

A first objective of the present invention is to provide a bi-directional switching regulator.

A second objective of the present invention is to provide a control circuit of a bi-directional switching regulator.

To achieve the above and other objectives, from one perspective, the present invention provides a bi-directional switching regulator for use under a charging mode to convert an input voltage supplied by an input terminal to an output voltage at an output terminal, or for use under a discharging mode to supply power from the output terminal to the input terminal, the switching regulator comprising: a power stage coupled between the input terminal and the output terminal; an operation circuit for generating a first operation signal to control an operation of the power stage, the operation circuit determining whether to operate under the charging mode or the discharging mode according to a mode control signal; and a power path management circuit having one end electrically connected to the output terminal and another end electrically connected to a battery, for controlling a charging operation from the output terminal to the battery, wherein under the charging mode, when the output voltage is lower than a predetermined level, the power path management circuit reduces a charging current supplied to the battery.

From another perspective, the present invention provides a control circuit of a bi-directional switching regulator, for controlling a power stage under a charging mode to convert an input voltage supplied by an input terminal to an output voltage at an output terminal, or under a discharging mode to supply power from the output terminal to the input terminal, the control circuit comprising: an operation circuit for generating a first operation signal to control a boost conversion operation or a buck conversion operation of the power stage, the operation circuit determining whether to conduct the boost conversion operation from the input terminal to the output terminal or to conduct the buck conversion operation from the output terminal to the input terminal according to a mode control signal; and a power path management circuit having one end electrically connected to the output terminal and another end electrically connected to a battery, for controlling a charging operation from the output terminal to the battery, wherein under the charging mode, when the output voltage is lower than a predetermined level, the power path management circuit reduces a charging current supplied to the battery.

In one embodiment, the output terminal is coupled to a system load; when the charging current is reduced to zero and the output voltage is still lower than the predetermined level, the power path management circuit causes the charging current to be a negative charging current, which is a current flowing from the battery to the output terminal.

In one embodiment, the power path management circuit includes: a power path switch electrically connected between the output terminal and the battery; and a power path controller for generating a second operation signal to control the power path switch, so that the charging current is controlled.

In one embodiment, the power path controller controls the charging current according to a signal related to a battery voltage of the battery, a signal related to the charging current and/or a signal related to the output voltage.

In one embodiment, the control circuit further comprises: a control signal generation circuit for generating a control signal according to the output voltage or a signal related to the output voltage, to control the operation circuit.

In one embodiment, the control circuit further comprises: a control signal generation circuit for generating a control signal according to the output voltage and a battery voltage of the battery, to control the operation circuit so that: (1) the output voltage is determined by a sum of a safety offset plus the battery voltage; or (2) the output voltage is determined by a higher one of a predetermined voltage level and the sum of the safety offset plus the battery voltage.

In one embodiment, the control circuit further comprises: an error amplifier for generating an error amplification signal according to the input voltage and a reference signal, wherein the error amplification signal is transmitted to the operation circuit so as to regulate the input voltage.

In one embodiment, the power path switch includes a transistor having a parasitic diode for preventing a reverse current from flowing from the output terminal toward the battery, so that the charging operation to the battery is controlled.

In one embodiment, the power path switch includes a transistor having a parasitic diode whose polarity is adjustable.

The objectives, technical details, features, and effects of the present invention will be better understood with regard to the detailed description of the embodiments below, with reference to the attached drawings.

DESCRIPTION OF THE PREFERRED EMBODIMENTS

Figure 1:
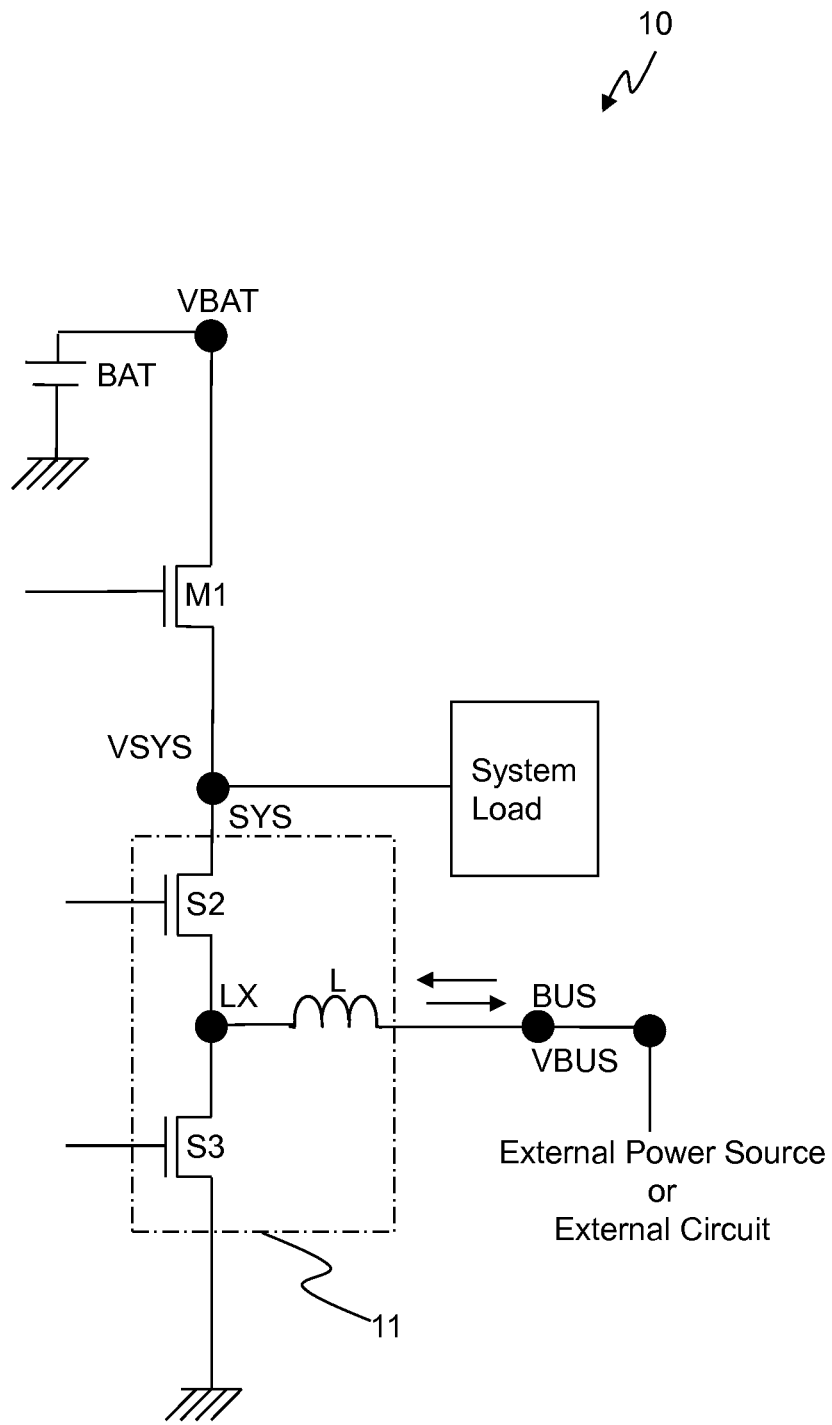
FIG. 1 shows a schematic diagram of a conventional bi-directional switching regulator.

The above and other technical details, features and effects of the present invention will be will be better understood with regard to the detailed description of the embodiments below, with reference to the drawings. In the description, the words relate to directions such as "upper", "lower", "left", "right", "forward", "backward", etc. are used to illustrate relative orientations in the drawings and should not be considered as limiting in any way. The drawings as referred to throughout the description of the present invention are for illustration only, to show the interrelations between the circuit and the devices, but not drawn according to actual scale.

Figure 2:
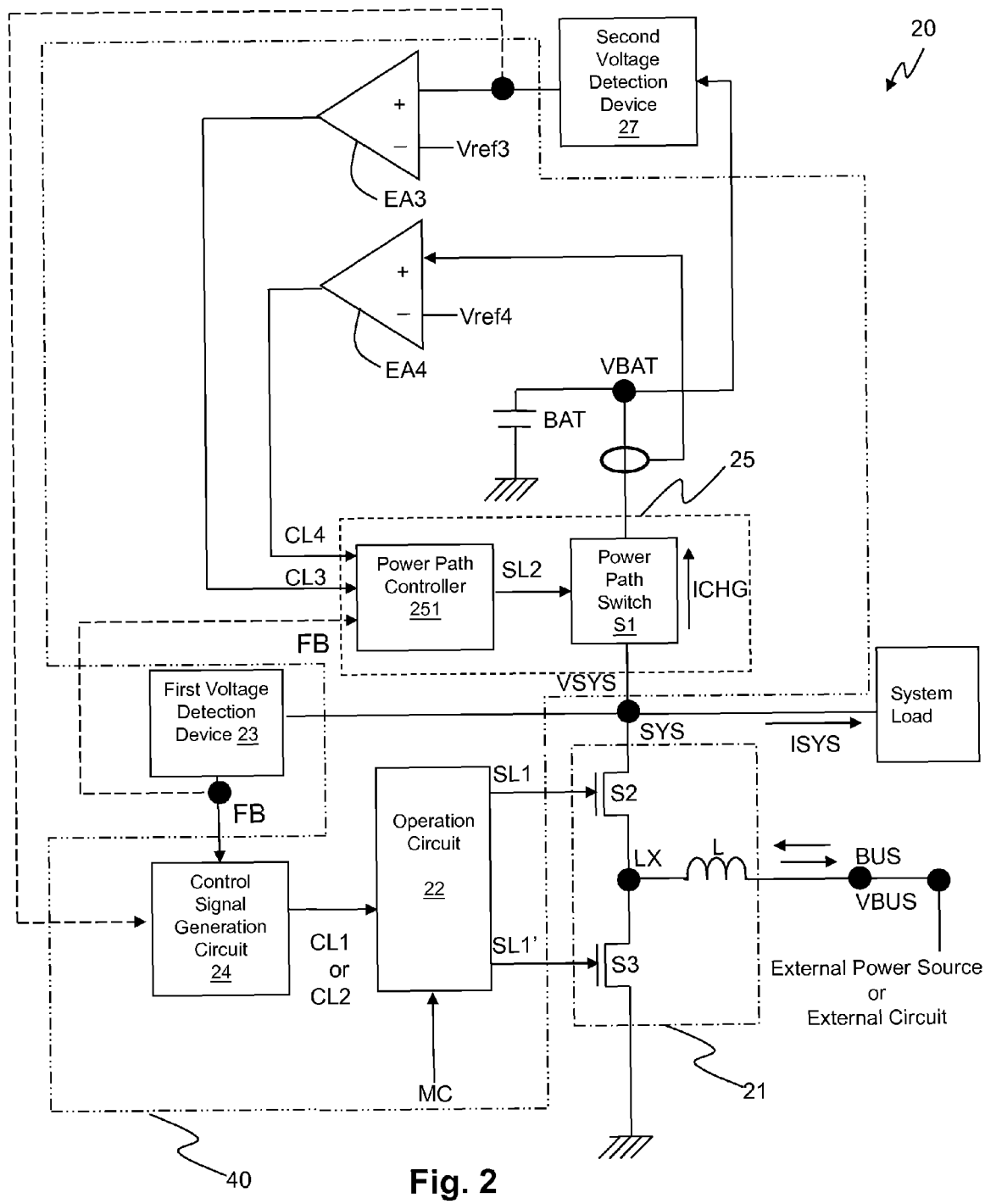
FIG. 2 shows a schematic diagram of a bi-directional switching regulator according to an embodiment of the present invention.

Please refer to FIG. 2, which shows a schematic diagram of a bi-directional switching regulator according to an embodiment of the present invention. The bi-directional switching regulator 20 can convert an input voltage VBUS supplied from an input terminal BUS to an output terminal VSYS at an output terminal SYS. The input terminal BUS can be coupled to an external power source to receive power from the external power source, or it can be coupled to an external circuit to supply power to the external circuit. The bi-directional switching regulator 20 comprises a power stage 21, an operation circuit 22 and a power path management circuit 25. The power stage 21 includes an upper-gate switch S2, a lower gate switch S3 and an inductor L. The upper-gate switch S2 has one end electrically connected to the output terminal SYS and another end electrically connected to a switching node LX. The lower-gate switch S3 has one end electrically connected to the switching node LX and another end electrically connected to ground. The upper-gate switch S2 and the lower-gate switch S3 can be, for example but not limited to, an NMOS transistor or a PMOS transistor. The operation circuit 22 generates a first set of operation signals SL1 and SL1' to control the operation (the ON/OFF state) of the upper-gate switch S2 and the lower-gate switch S3. The bi-directional switching regulator 20 further comprises a control signal generation circuit 24. The control signal generation circuit 24 generates a first control signal CL1 or a second control signal CL2 according to the output voltage VSYS or its related signal, to control the operation of the operation circuit 22. The details concerning how the control signal generation circuit 24 generates the first control signal CL1 and the second control signal CL2 will be discussed later.

The operation circuit 22 can determine whether to operate under a charging mode (i.e., performing a boost power conversion and supplying power to the output terminal SYS from the external power source connected to the input terminal BUS) or a power supply mode (i.e., performing a buck power conversion and supplying power from the battery BAT to the external circuit connected to the input terminal BUS) according to for example a mode control signal MC. The mode control signal MC can be generated in various ways. For example, it can be inputted from an external circuit, inputted by a user, or determined according to an operation characteristic of the input terminal BUS. An example of the latter is thus. a determination can be made as to whether the input terminal BUS is sinking or sourcing the current. If the input terminal BUS is sinking current, it is determined that the input terminal BUS is coupled to an external circuit; if the input terminal BUS is sourcing current, it is determined that the input terminal BUS is coupled to an external power source. Different types of terminals have their corresponding industrial specifications, and a determination of sinking or sourcing current can be made accordingly. Or, it is also practicable to switch the buck/boost mode by external control.

The power path management circuit 25 has one end electrically connected to the output terminal SYS and another end electrically connected to a battery BAT. The power path management circuit 25 includes a power path switch S1 and a power path controller 251, wherein the power path switch S1 is electrically connected between the output terminal SYS and the battery BAT. When the input terminal BUS of this embodiment receives power from the external power source, such power supplied from the external power source can charge the battery BAT through the boost conversion operation of the power stage 21. Under such circumstance, according to a current feedback control loop (to control the charging current ICHG to the battery BAT in compliance with a desired specification), and a voltage feedback control loop for the battery voltage VBAT (to determine whether the battery BAT is fully charged so as stop charging), the power path controller 251 generates a second operation signal SL2 to control the power path switch S1, so that the charging operation to the battery BAT is under control.

In this embodiment where it is intended for the battery terminal to be connected to a battery BAT to be charged, the bi-directional switching regulator 20 can optionally comprise error amplifiers EA3 and EA4. The voltage feedback control for the battery voltage VBAT can be carried out by comparing the battery voltage VBAT with a reference signal Vref3, which is performed by the error amplifier EA3, to generate a control signal CL3. Accordingly, when a boost power conversion is performed from the external power source to the input terminal BUS to charge the battery BAT, the power path controller 251 can generate a second operation signal SL2 according to the control signal CL3, to control the operation of the power path switch S1. The current feedback control for the charging current ICHG to the battery BAT can be carried out by comparing the charging current ICHG flowing through the power path switch S1 with a reference signal Vref4, which is performed by the error amplifier EA4, to generate a control signal CL4. Accordingly, when a boost power conversion is performed from the external power source to the input terminal BUS to charge the battery BAT, the power path controller 251 can generate the second operation signal SL2 according to the control signal CL4, to control the operation of the power path switch S1. In another embodiment where it is not required to charge the battery BAT, for example when there is no battery terminal or when the battery terminal is not connected with a battery, the current information is not required and the feedback control loop does not need to retrieve the current information; or in yet another embodiment, the information of the current from the internal terminal BUS to the external terminal can be obtained, for the purpose such as over-current protection.

The function of the above control loops is that: the power path controller 251 controls the charging operation from the output terminal SYS to the battery BAT according to information of the battery voltage VBAT of the battery BAT and information of the charging current ICHG flowing through the power path switch S1.

In one embodiment, the voltage detection of the battery BAT can be carried out through, for example but not limited to, a second voltage detection device 27. The second voltage detection device 27 can be, for example but not limited to, a voltage divider circuit. The second voltage detection device 27 transmits the detected voltage to the error amplifier EA3. The error amplifier EA3 generates the control signal CL3 according to the detected voltage and the reference signal Vref3, to control the operation of the power path controller 251. In this embodiment, the reference signal Vref3 corresponds to a safe upper limit for the battery voltage VBAT, to keep the battery voltage VBAT not to exceed the safe value or to determine whether the battery BAT is fully charged. In another embodiment, the reference signal Vref3 can be set for another purpose. Note that the second voltage detection device 27 described in the above can be omitted, that is, the input of the error amplifier EA3 can be directly connected to the corresponding voltage sensing node.

In one embodiment, the detection of the charging current ICHG flowing through the power path switch S1 can be carried out through, for example but not limited to, a current detection device. The current detection device can be, for example but not limited to, a detection transistor connected to the power path switch S1 in parallel or a detection resistor connected to the path for the charging current ICHG in series. There are many approaches for current detection, and the scope of the present invention is not limited to any one of them. The current detection device transmits the current detection result to the error amplifier EA4. The error amplifier EA4 generates the control signal CL4 according to the current detection result and the reference signal Vref4, to control the operation of the power path controller 251. The reference signal Vref4 corresponds to a safe upper limit of the charging current ICHG to the battery BAT, or a value which is set according to design requirements. By the setting of the reference signal Vref4, the bi-directional switching regulator 20 can keep the charging current ICHG not to exceed the set value.

The feedback control described in the above demonstrates that the present invention, on one hand, can control the power path switch S1 through the second operation signal SL2 generated by the power path controller 251, so that the charging operation to the battery BAT is controlled; on the other hand, the present invention also controls the power conversion from the input terminal BUS to the output terminal SYS through the control signals CL1 and CL2 generated by the control signal generation circuit 24.

When a sum of the charging current ICHG to the battery BAT plus a current ISYS required by the system load is too high, the output voltage VSYS will drop significantly to become lower than a predetermined level. Under such circumstance, in one embodiment, the power path controller 251 can reduce the charging current ICHG according to a signal related to the output voltage VSYS (for example but not limited to the feedback signal FB). Under normal operation, such arrangement can ensure that the current is supplied to the system load in a higher priority. Under abnormal operation (e.g., when the battery terminal is short-circuited), such arrangement can limit the short-circuit current to prevent the circuit from being damaged. It should be noted that, to determine whether the sum of the charging current ICHG plus the current ISYS is too high, the output voltage VSYS is only one among many possible indicators (this is why the connection relationship between the feedback signal and the power path controller 251 is represented by a dashed line). For example, whether the total current is too high can also be determined by detecting the current ISYS and the charging current ICHG.

Furthermore, under normal operation, when the charging current ICHG is reduced to zero and the output voltage VSYS still does not restore to an appropriate level (which indicates insufficient power supply capability of the input terminal BUS), the power path controller 251 can control the power path switch S1 in such a way that the charging current ICHG becomes a negative charging current (i.e., flowing from the battery BAT to the output terminal SYS), so that the requirement of the system load is fulfilled in a higher priority.

As one embodiment of how the control signal generation circuit 24 generates the control signals CL1 and CL2, the control signals CL1 and CL2 can be generated simply according to a desired target level of the output voltage VSYS. Under such circumstance, it is simply needed to obtain the signal related to the output voltage VSYS (e.g., the feedback signal FB shown in FIG. 2) and feed-back such signal to the control signal generation circuit 24. In another embodiment, the control signals CL1 and CL2 can be generated according to the relationship between the output voltage VSYS and the battery voltage VBAT. Under such circumstance, it is required for the control signal generation circuit 24 to also obtain the signal related to the battery voltage VBAT (as shown by the dashed line in FIG. 2). How the operation circuit 22 of the present invention generates the control signals CL1 and CL2 according to the relationship between the output voltage VSYS and the battery voltage VBAT will be described with reference to FIGS. 3A-3B.

Figure 3A:
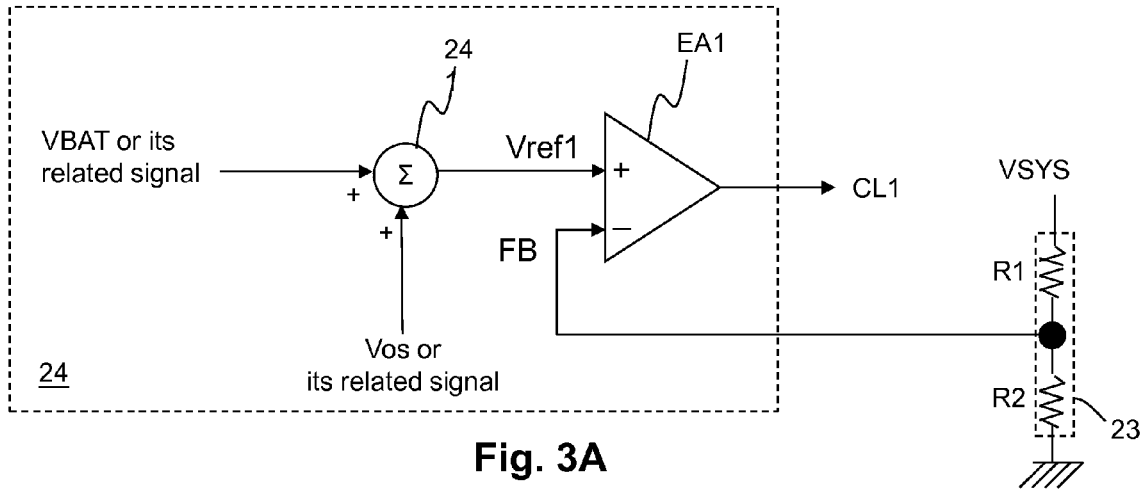
FIGS. 3A-3C show several embodiments of the control signal generation circuit of the present invention.
Figure 4:
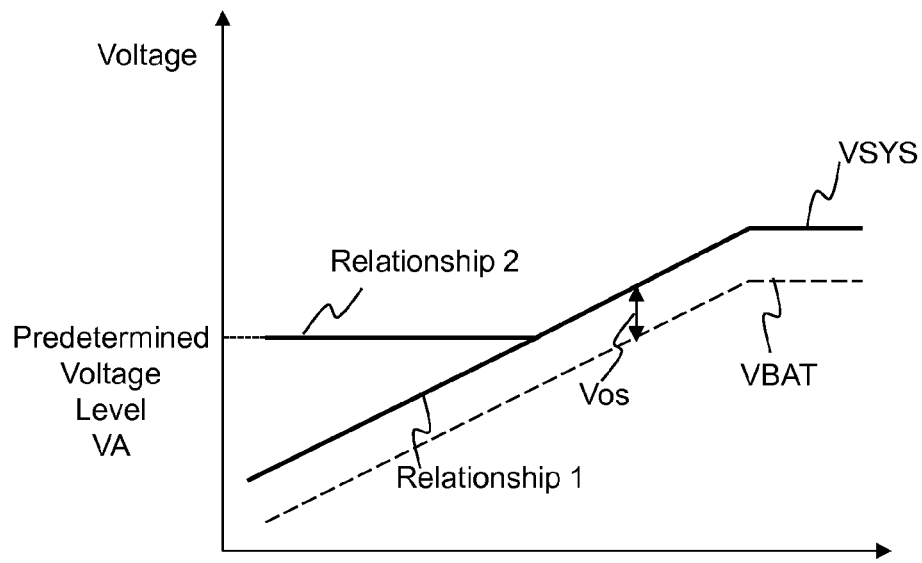
FIG. 4 shows a diagram illustrating a relationship among the output voltage VSYS, the battery voltage VBAT and the predetermined voltage level VA.
Figure 5:
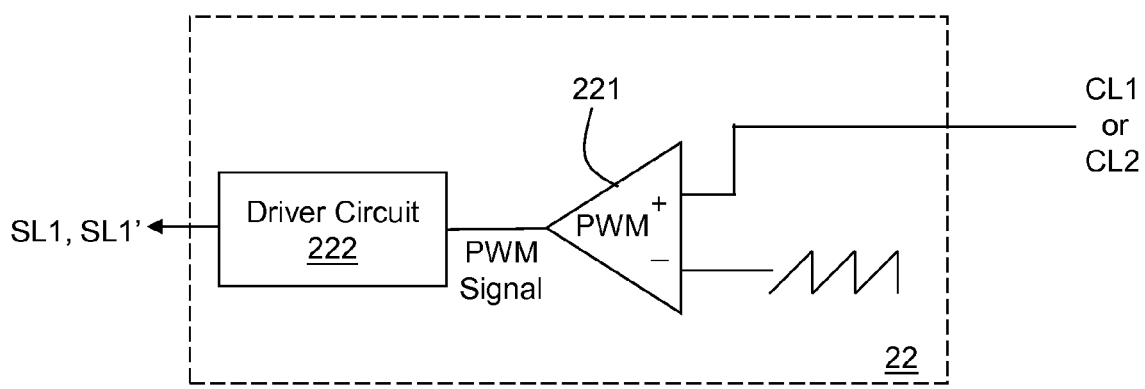
FIG. 5 shows an embodiment of the operation circuit of the present invention.

First, please refer to FIG. 3A in conjugation with FIG. 2 and FIG. 4. FIG. 4 shows a diagram illustrating a relationship among the output voltage VSYS, the battery voltage VBAT and the predetermined voltage level VA. In one embodiment, the output voltage VSYS is determined by a sum of a safety offset Vos plus the battery voltage VBAT (as shown by the relationship 1 in FIG. 4). In this case, the control signal generation circuit 24 of the present invention can comprise an adder 241 and an error amplifier EA1. The adder 241 adds the battery voltage VBAT (or its related signal) with the safety offset Vos (or its related signal), to generate a reference signal Vref1. The error amplifier EA1 compares the feedback signal FB related to the output voltage VSYS with the reference signal Vref1, to generate the control signal CL1. In one embodiment, as shown in FIG. 3A, the feedback signal FB can be obtained by detecting the output terminal SYS through, for example but not limited to, a first voltage detection device 23. The first voltage detection device 23 can be, for example, a voltage divider circuit, which includes two resistors R1 and R2 connected to each other in series. One terminal of the resistor R1 is coupled to the output voltage VSYS, and one terminal of the resistor R2 is coupled to the ground. The feedback signal FB is extracted from the voltage difference across the resistor R2. The control signal CL1 generated by the control signal generation circuit 24 is inputted to the operation circuit 22. Please also refer to FIG. 5, which shows a more specific embodiment of the operation circuit 22 of the present invention. The operation circuit 22 can include, for example, a pulse width modulation (PWM) signal generator 221 and a driver circuit 222. The PWM signal generator 221 compares the control signal CL1 with a saw-tooth wave signal to generate a PWM signal. The driver circuit 222 generates the operation signals SL1 and SL1' (wherein the operation signals SL1 and SL1' can be, for example, complementary (inverse-phase) to each other) to control the power conversion from the input terminal BUS to the output terminal SYS. The above-mentioned configuration of the operation circuit 22 is for illustrative purpose, but not for limiting the scope of the present invention. The operation circuit 22 can adopt other configurations. For example, the PWM signal generator 221 can be replaced by a one-shot pulse generator, which generates a pulse having a fixed length according to the crossing point between the control signal CL1 and a saw-tooth wave signal. There are various known configurations operating under fixed frequency or variable frequency, and the operation circuit 22 of the present invention is not limited to any one of them.

Figure 3B:
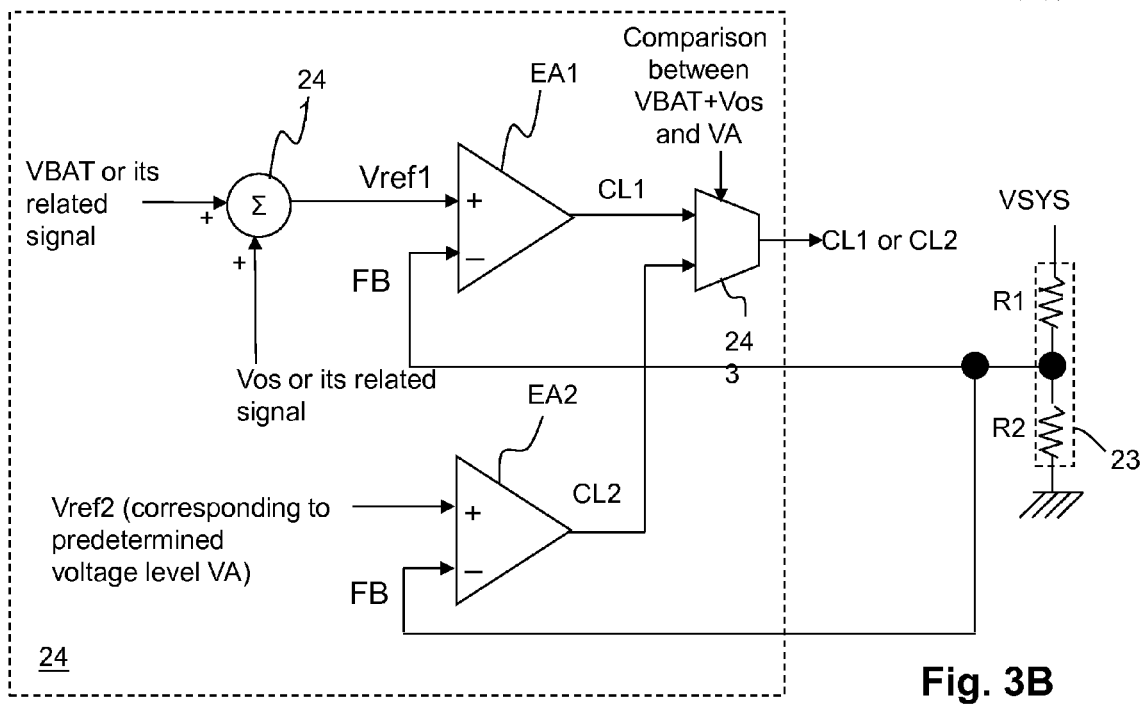

Please refer to FIG. 3B in conjugation with FIG. 2 and FIG. 4. In another embodiment, the output voltage VSYS can be determined by a higher one of a predetermined voltage level VA and the sum of the safety offset Vos plus the battery voltage VBAT (as shown by the relationship 2 in FIG. 4). Under such circumstance, the control signal generation circuit 24 can include, in addition to the adder 241 and the error amplifier EA1 shown in FIG. 3A, another error amplifier EA2 and a multiplexer 243. The adder 241 adds the battery voltage VBAT (or its related signal) with the safety offset Vos (or its related signal), to generate a sum as the reference signal Vref1. Another reference signal Vref2 corresponds to the predetermined voltage level VA. The error amplifier EA1 compares the feedback signal FB related to the output voltage VSYS with the reference signal Vref1, to generate the control signal CL1. The error amplifier EA2 compares the feedback signal FB with the reference signal Vref2, to generate the control signal CL2. When the sum of the safety offset Vos plus the battery voltage VBAT is greater than the predetermined voltage level VA (as shown by the right part in FIG. 4), the multiplexer 243 outputs the control signal CL1. When the sum of the safety offset Vos plus the battery voltage VBAT is smaller than or equal to the predetermined voltage level VA (as shown by the left part in FIG. 4), the multiplexer 243 outputs the control signal CL2.

The function of the above control loops is that: the control signal generation circuit 24 generates the control signal CL1 according to the relationship between the output voltage VSYS and the battery voltage VBAT, and generates the control signal CL2 according to the predetermined voltage level VA, to control the power conversion from the input terminal BUS to the output terminal SYS.

Figure 3C:
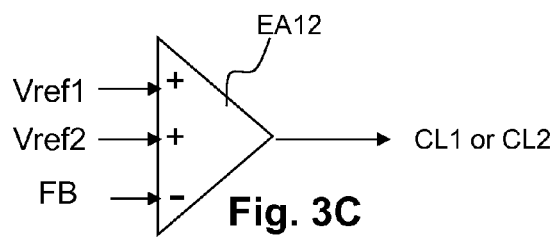

It should be noted that FIG. 3B is for purpose of illustration. In fact, the same or similar function of FIG. 3B can be fulfilled by one error amplifier EA12 having multiple input terminals as shown in FIG. 3C, which is a more simplified circuit.

In one embodiment, the operation circuit 22, the control signal generation circuit 24, the power path management circuit 25 and the error amplifiers EA3 and EA4 can be all or partially integrated into a control circuit 40 as an integrated circuit by a semiconductor manufacturing process.

Figure 6:
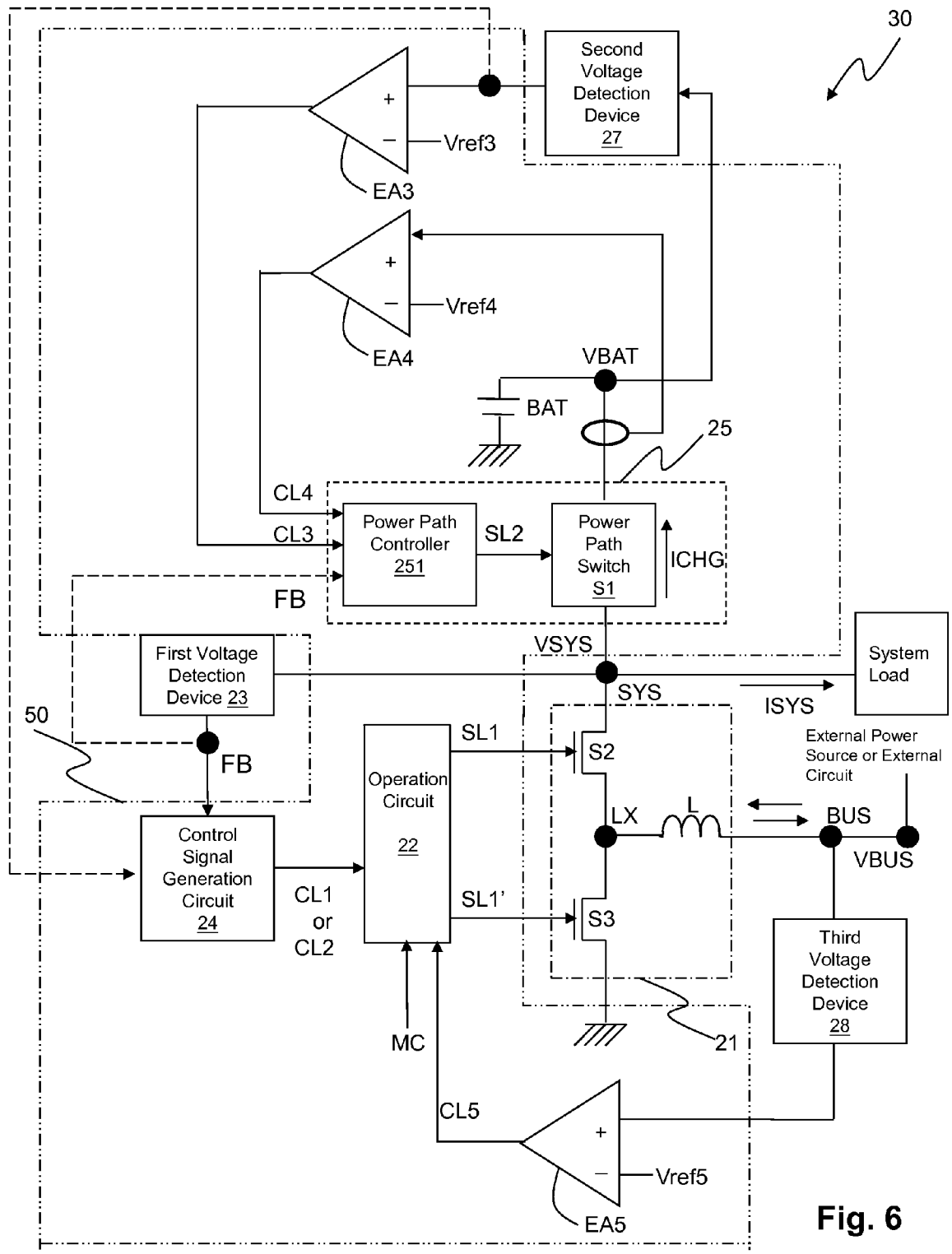
FIG. 6 shows a schematic diagram of a bi-directional switching regulator according to another embodiment of the present invention.

Please refer to FIG. 6, which shows a schematic diagram of a bi-directional switching regulator according to another embodiment of the present invention. Please refer to both FIG. 2 and FIG. 6. The bi-directional switching regulator 30 of this embodiment operates according to substantially the same mechanism as the bi-directional switching regulator 20 of the above-mentioned embodiment, but is different in that the bi-directional switching regulator 30 of this embodiment can further include an error amplifier EA5. When the bi-directional switching regulator 30 of this embodiment performs a buck power conversion and supplies power to the external circuit connected to the input terminal BUS from the output terminal SYS (or the battery BAT) through the power stage 21, a voltage feedback control loop for the input voltage VBUS is formed by the error amplifier EA5. The error amplifier EA5 determines whether the input voltage VBUS is regulated to a desired target level under the buck power conversion. When the bi-directional switching regulator 30 of this embodiment performs a boost power conversion and supplies power from the input terminal BUS to the output terminal SYS, the output of the error amplifier EA5 can indicate whether the input voltage VBUS is too low. When the input voltage VBUS is abnormally too low, the operation circuit 22 will stop the operation of the power stage 21 according to the output of the error amplifier EA5.

In one embodiment, the voltage detection of the input terminal can be carried out through, for example but not limited to, a third voltage detection device 28. The third voltage detection device 28 can be, for example but not limited to, a voltage divider circuit. The third voltage detection device 28 transmits the voltage detection result to the error amplifier EA5. The error amplifier EA5 generates the control signal CL5 according to the voltage detection result and the reference signal Vref5, to control the operation of the operation circuit 22. In this embodiment, the reference signal Vref5 corresponds to a desired target level for the input voltage VBUS under a buck power conversion, and the bi-directional switching regulator 30 regulates the input voltage VBUS to the desired level when it performs the buck power conversion. In other embodiments, the reference signal Vref5 can be set according to design requirements. The bi-directional switching regulator 30 of this embodiment operates according to substantially the same mechanism as the bi-directional switching regulator 20 of the above-mentioned embodiment, so it has substantially the same advantages and efficacies as the bi-directional switching regulator 20, which are not redundantly repeated here.

The third voltage detection device 28 described in the above can be omitted, that is, the input of the error amplifier EA5 can be directly connected to the corresponding voltage sensing node.

In one embodiment, similarly, the operation circuit 22, the control signal generation circuit 24, the power path management circuit 25 and the error amplifiers EA3, EA4 and EA5 can be all or partially integrated into a control circuit 50 as an integrated circuit by a semiconductor manufacturing process.

Figure 7A:
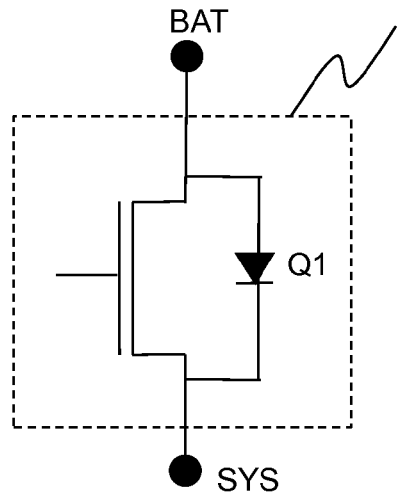
FIGS. 7A-7D show several embodiments of the power path switch.
Figure 7B:
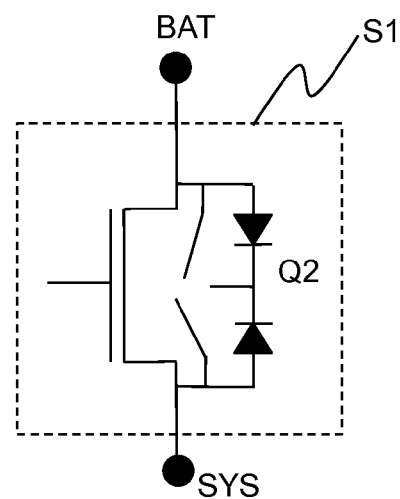
Figure 7C:
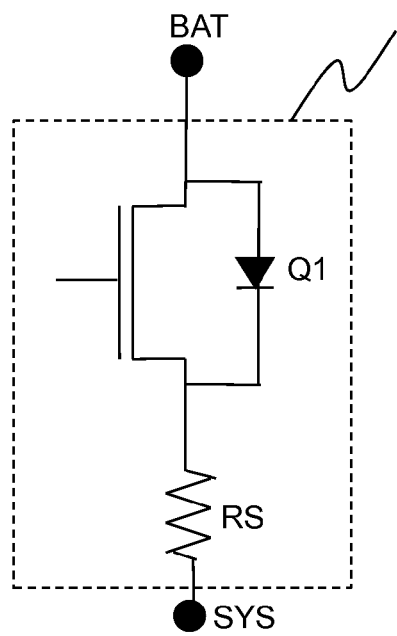
Figure 7D:
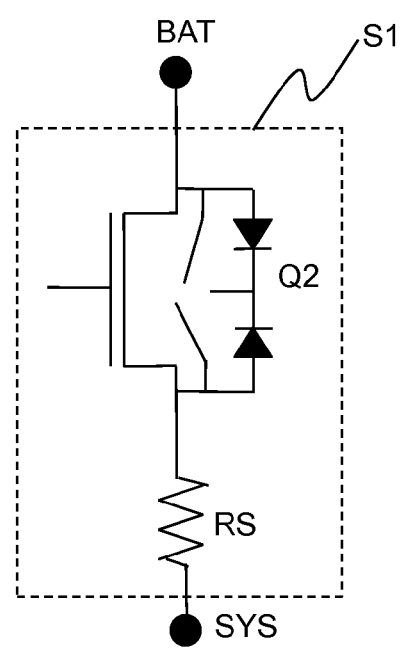

Please refer to FIGS. 7A-7D, which show several embodiments of the power path switch. The power path switch S1 includes a transistor Q1 (as shown in FIG. 7A) or a transistor Q2 whose parasitic diode polarity is adjustable (as shown in FIG. 7B). In addition, the power path switch S1 can further include a resistor which is coupled to the transistor Q1 (as shown in FIG. 7C) or the transistor Q2 whose parasitic diode polarity is adjustable (as shown in FIG. 7D). In the embodiment shown in FIGS. 7A and 7C, the parasitic diode of the transistor Q1 has its anode electrically connected to the battery BAT and its cathode electrically connected to the output terminal SYS. Accordingly, when the output voltage VSYS at the output terminal SYS is higher than the battery voltage VBAT of the battery BAT, the parasitic diode of the transistor Q1 is capable of preventing a reverse current from flowing in the reverse direction from output terminal SYS to the battery BAT. Or, for another example, as shown in FIGS. 7B and 7D, the parasitic diode of the transistor Q2 has a polarity which is adjustable. Therefore, when the output voltage VSYS at the output terminal SYS is higher than the battery voltage VBAT of the battery BAT, the anode-cathode direction of the parasitic diode can be set to be opposite to the direction of the reverse current to prevent the reverse current from flowing in the reverse direction. And when the output voltage VSYS at the output terminal SYS is lower than the battery voltage VBAT of the battery BAT, to prevent a forward current from flowing in the forward direction from the battery BAT toward the output terminal SYS (e.g., when it is desired to stop operating the bi-directional switching regulator 20), the anode-cathode direction of the parasitic diode can be set to be opposite to the direction of the forward current. Thus, the power path switch S1 can protect the battery BAT or control the current.

Figure 8:
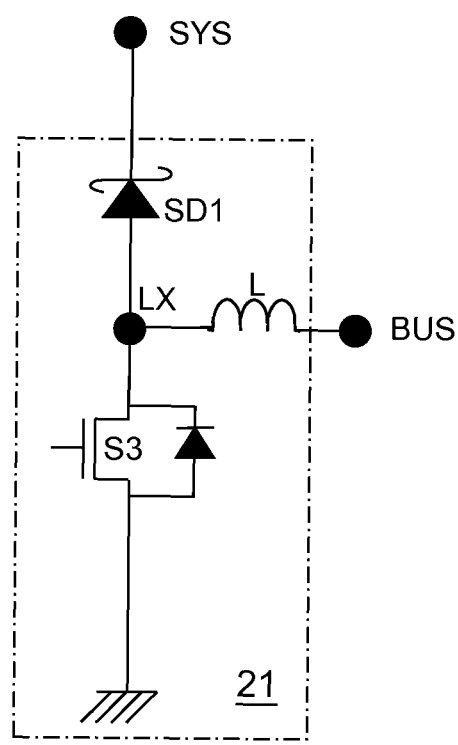
FIG. 8 shows another embodiment of the power stage when the power stage is under a boost conversion operation.

Please refer to FIG. 8 in conjugation with FIG. 2. FIG. 8 shows another embodiment of the power stage 21 when the power stage 21 is under a boost operation. When the bi-directional switching regulator 20 is simply required to perform a boost power conversion (unidirectional operation) instead of a buck/boost power conversion (bi-directional operation), in one embodiment, the upper-gate switch S2 shown in FIG. 2 can be replaced by a Schottky diode SD1, as shown in FIG. 8.

The present invention has the features and the advantages described below. On one hand, the power path controller 251 of the present invention can generate the second operation signal SL2 according to the battery voltage VBAT of the battery BAT and the charging current ICHG flowing through the power path switch S1, to control the power path switch S1, so that the charging operation to the battery BAT is controlled. On the other hand, the operation circuit 22 of the present invention generates the control signal CL1 or CL2 according to the relationship between the output voltage VSYS and the battery voltage VBAT, so that the power conversion from the input terminal BUS to the output terminal SYS is controlled. Thus, the present invention is capable of effectively controlling the charging current to prevent the circuit from being crashed and preventing the battery from being damaged.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the power path switch S1, the upper-gate switch S2, the lower-gate switch S3 can be a PMOS transistor or an NMOS transistor. For another example, the positive and negative input terminals of an error amplifier circuit or a comparator are interchangeable, with corresponding amendments of the circuits processing these signals. In view of the foregoing, the spirit of the present invention should cover all such and other modifications and variations, which should be interpreted to fall within the scope of the following claims and their equivalents.

What is claimed is:

1. A bi-directional switching regulator for use under a charging mode to convert an input voltage supplied by an input terminal to an output voltage at an output terminal, or for use under a discharging mode to supply power from the output terminal to the input terminal, the switching regulator comprising:

a power stage coupled between the input terminal and the output terminal;

an operation circuit for generating a first operation signal to control an operation of the power stage, the operation circuit determining whether to operate under the charging mode or the discharging mode according to a mode control signal;

a power path management circuit having one end electrically connected to the output terminal and another end electrically connected to a battery, for controlling a charging operation from the output terminal to the battery, wherein under the charging mode, when the output voltage is lower than a predetermined level, the power path management circuit reduces a charging current supplied to the battery; and a control signal generation circuit for generating a control signal according to the output voltage and a battery voltage of the battery, to control the operation circuit so that:

(1) the output voltage is determined by a sum of a safety offset plus the battery voltage; or (2) the output voltage is determined by a higher one of a predetermined voltage level and the sum of the safety offset plus the battery voltage.

2. The bi-directional switching regulator of claim 1, wherein the output terminal is coupled to a system load; when the charging current is reduced to zero and the output voltage is still lower than the predetermined level, the power path management circuit causes the charging current to be a negative charging current, which is a current flowing from the battery to the output terminal.

3. The bi-directional switching regulator of claim 1, wherein the power path management circuit includes:

a power path switch electrically connected between the output terminal and the battery; and a power path controller for generating a second operation signal to control the power path switch, so that the charging current is controlled.

4. The bi-directional switching regulator of claim 3, wherein the power path controller controls the charging current according to a signal related to a battery voltage of the battery, a signal related to the charging current and/or a signal related to the output voltage.

5. The bi-directional switching regulator of claim 1, further comprising:

a control signal generation circuit for generating a control signal according to the output voltage or a signal related to the output voltage, to control the operation circuit.

6. The bi-directional switching regulator of claim 1, further comprising:
an error amplifier for generating an error amplification signal according to the input voltage and a reference signal, wherein the error amplification signal is transmitted to the operation circuit so as to regulate the input voltage.

7. The bi-directional switching regulator of claim 1, wherein the power path switch includes a transistor having a parasitic diode for preventing a reverse current from flowing from the output terminal toward the battery.

8. The bi-directional switching regulator of claim 1, wherein the power path switch includes a transistor having a parasitic diode whose polarity is adjustable.

9. A control circuit of a bi-directional switching regulator, for controlling a power stage under a charging mode to convert an input voltage supplied by an input terminal to an output voltage at an output terminal, or under a discharging mode to supply power from the output terminal to the input terminal, the control circuit comprising:
an operation circuit for generating a first operation signal to control a boost conversion operation or a buck conversion operation of the power stage, the operation circuit determining whether to conduct the boost conversion operation from the input terminal to the output terminal or to conduct the buck conversion operation from the output terminal to the input terminal according to a mode control signal;
a power path management circuit having one end electrically connected to the output terminal and another end electrically connected to a battery, for controlling a charging operation from the output terminal to the battery, wherein under the charging mode, when the output voltage is lower than a predetermined level, the power path management circuit reduces a charging current supplied to the battery; and
a control signal generation circuit for generating a control signal according to the output voltage and a battery voltage of the battery, to control the operation circuit so that:
(1) the output voltage is determined by a sum of a safety offset plus the battery voltage; or
(2) the output voltage is determined by a higher one of a predetermined voltage level and the sum of the safety offset plus the battery voltage.

10. The control circuit of claim 9, wherein the output terminal is coupled to a system load; when the charging current is reduced to zero and the output voltage is still lower than the predetermined level, the power path management circuit causes the charging current to be a negative charging current, which is a current flowing from the battery to the output terminal.

11. The control circuit of claim 9, wherein the power path management circuit includes:
a power path switch electrically connected between the output terminal and the battery; and
a power path controller for generating a second operation signal to control the power path switch, so that the charging current is controlled.

12. The control circuit of claim 11, wherein the power path controller controls the charging current according to a signal related to a battery voltage of the battery, a signal related to the charging current and/or a signal related to the output voltage.

13. The control circuit of claim 9, further comprising:
a control signal generation circuit for generating a control signal according to the output voltage or a signal related to the output voltage, to control the operation circuit.

14. The control circuit of claim 9, further comprising:
an error amplifier for generating an error amplification signal according to the input voltage, wherein the error amplification signal is transmitted to the operation circuit so as to regulate the input voltage.

15. The control circuit of claim 9, wherein the power path switch includes a transistor having a parasitic diode for preventing a reverse current from flowing from the output terminal toward the battery.

16. The control circuit of claim 9, wherein the power path switch includes a transistor having a parasitic diode whose polarity is adjustable.

* * * * *